(12) United States Patent
Yamasaki

(10) Patent No.: US 8,964,266 B2
(45) Date of Patent: Feb. 24, 2015

(54) IMAGE READING DEVICE, IMAGE FORMING APPARATUS, AND OPTICAL UNIT

(71) Applicant: KYOCERA Document Solutions Inc., Osaka (JP)

(72) Inventor: Shunsuke Yamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/306,620

(22) Filed: Jun. 17, 2014

(65) Prior Publication Data

US 2014/0376067 A1  Dec. 25, 2014

(30) Foreign Application Priority Data

Jun. 25, 2013  (JP) ................................ 2013-132774

(51) Int. Cl.
*H04N 1/04* (2006.01)
*H04N 1/10* (2006.01)
*H04N 1/46* (2006.01)

(52) U.S. Cl.
CPC .................................. *H04N 1/1039* (2013.01)
USPC ............ 358/497; 358/474; 358/496; 358/505

(58) Field of Classification Search
USPC ............. 358/1.1, 1.4, 1.5, 1.6, 474, 475, 495, 358/496, 497, 498, 505
See application file for complete search history.

(56) References Cited

U.S. PATENT DOCUMENTS

| 7,119,934 | B2 | 10/2006 | Yoshida et al. |
| 7,235,769 | B2 | 6/2007 | Uemura |
| 2002/0121590 | A1 | 9/2002 | Yoshida et al. |
| 2004/0080614 | A1 | 4/2004 | Uemura |
| 2004/0100668 | A1 | 5/2004 | Yoshida |

FOREIGN PATENT DOCUMENTS

| JP | H10-186535 A | 7/1998 |
| JP | 2002-262032 A | 9/2002 |

*Primary Examiner* — Thierry L Pham
(74) *Attorney, Agent, or Firm* — Studebaker & Brackett PC

(57) ABSTRACT

An optical unit of an image reading device has the center of gravity in a position toward a first sub scanning direction, relative to the middle point of the optical unit in terms of sub scanning directions. An engagement part is provided in a position toward a first main scanning direction relative to a sliding part. A plurality of pairs of pinching parts include a first pair provided in a position toward the first sub scanning direction and a second pair provided in a position toward a second sub scanning direction. Of the two pinching parts in the second pair, the pinching part provided in a position toward the first main scanning direction is biased by a first biasing member toward a rail part side, and the pinching part provided in a position toward a second main scanning direction is not biased by the first biasing member.

10 Claims, 15 Drawing Sheets

IMAGE READING DEVICE, IMAGE FORMING APPARATUS, AND OPTICAL UNIT

INCORPORATION BY REFERENCE

The present application claims priority under 35 U.S.C. §119 to Japanese Patent Application No. 2013-132774, filed Jun. 25, 2013. The contents of this application are incorporated herein by reference in their entirety.

BACKGROUND

The present disclosure relates to an image reading device, an image forming apparatus, and an optical unit. In particular, the present disclosure relates to the optical unit that is movable in sub scanning directions, the image reading device that includes the optical unit, and the image forming apparatus that includes the image reading device.

Image reading devices are installed in, for example, multifunction peripherals that use an electrophotographic process. A type of image reading device includes an Automatic Document Feeder (ADF) configured to sequentially forward sheets of an original document to a document table (a glass plate) so as to read images from the sheets and to discharge the sheets from the document table after the image reading process has finished.

An image reading device that includes the ADF described above is capable of reading images by implementing primarily two methods (a sheet-through method and a fixed original document method). According to the sheet-through method, an original document conveyance device automatically conveys an original document while an original document presser is kept closed, so that a scanner unit provided in the image reading device reads the images from the original document. According to the sheet-through method, the operation of reading the images from the original document is performed while the scanner unit provided in the image reading device is held in a predetermined image reading position, without being moved. According to the fixed original document method, every time the scanner unit provided in the image reading device has read an image from a sheet of original document by being moved in a sub scanning direction, another sheet of original document is placed on the document table to replace the already-read sheet, by opening and closing the original document presser.

Examples of image reading methods that can be used by a scanner unit include: a Charge-Coupled Device (CCD) method employing a charge-coupled device (a reading sensor); and a Contact Image Sensor (CIS) method employing a photoelectric conversion device (a reading sensor) called a Complementary Metal-Oxide Semiconductor (CMOS) sensor.

When a scanner unit implementing the CCD method is used, because the depth of field is deep, it is easy to bring even an original document that is not flat into focus. Thus, even if the original document (e.g., an original document in the form of a book) is not in close contact with the document table, it is possible to read images from the original document in a uniform manner. Further, scanner units implementing the CCD method have an advantage of being able to read (scan) images at a high speed. However, scanner units implementing the CCD method are disadvantageous in terms of the cost, because the structures thereof tend to be complicated and large-scaled.

In contrast, scanner units implementing the CIS method do not require any minors. Thus, it is easy to design scanner units implementing the CIS method to be thin. Scanner units implementing the CIS method are advantageous in terms of the cost, because the structures thereof are simple. However, the depth of field of CMOS sensors is shallower than that of CCD sensors. Thus, it is more difficult for scanner units implementing the CIS method to uniformly read images from an original document that is not flat. It is considered that scanner units implementing the CIS method require an adjustment with a high level of precision for the distance thereof to an original document.

Next, two image reading devices that are able to read images by implementing the two methods (the sheet-through method and the fixed original document method) will be explained.

A first image reading device includes: a document table glass plate on which an original document is loaded; an optical unit including a scanner unit, a guide shaft, and a timing belt. The scanner unit is positioned underneath the document table glass plate and is configured to read an image from an original document placed on the document table glass plate by scanning the original document in a sub scanning direction. The guide shaft is configured to support the optical unit in such a manner that the optical unit is slidable in sub scanning directions. A bearing configured to slide with respect to the guide shaft is provided in a lower part of the optical unit. The timing belt is configured to move the optical unit in the sub scanning directions.

A second image reading device includes: an optical unit including a scanner unit (a contact image sensor unit); a rail part; and a driving mechanism. The rail part is configured to support the optical unit in such a manner that the optical unit is slidable in sub scanning directions. A bearing configured to slide with respect to the rail part is provided in a lower part of the optical unit. The driving mechanism is configured to move the optical unit in the sub scanning directions.

As shown in FIG. 14, each of the first and the second image reading devices employs a shaft 101 having a circular or oval cross section, as a rail part. A bearing 102 (a sliding part) is provided in a lower part of the optical unit. The bearing 102 has a recess 102a having a semi-circular or semi-oval cross section. As another example, as shown in FIG. 15, a U-shaped bearing 103 (a sliding part) that is in contact with the shaft 101 having a circular cross section by three planes is also known.

In each of the first and the second image reading devices, the scanner unit implementing the CIS method is kept in close contact with the bottom face of the document table (e.g., the glass plate). More specifically, one or more springs are provided to bias the scanner unit upward. In addition, a sliding member configured to slide while being in contact with the document table is provided on the top face of the scanner unit. As a result of these arrangements, the distance between the scanner unit and an original document is maintained to be constant.

SUMMARY

An image reading device of the present disclosure includes: a document table on which an original document is loaded; an optical unit; a rail part; and a driving device. The optical unit is positioned underneath the document table and is configured to read an image from the original document loaded on the document table by scanning the original document in at least one of sub scanning directions. The rail part is provided so as to extend in the sub scanning directions and is configured to support the optical unit in such a manner that the optical unit is slidable in the sub scanning directions. The driving device is configured to move the optical unit in the sub scanning directions. The optical unit includes: a sliding part configured to slide while being in contact with the rail part; a plurality of pairs of pinching parts; a first biasing member, and an engagement part configured to be engageable with the driving device. Each of the plurality of pairs of pinching parts is configured to pinch the rail part from both sides thereof in terms of main scanning directions that are orthogonal to the sub scanning directions. The first biasing member is provided for at least one of the pinching parts and is configured to bias the pinching part toward the rail part side. The center of gravity of the optical unit is in a position toward a first sub scanning direction, relative to the middle point of the optical unit in terms of the sub scanning directions, the first sub scanning direction being one of the sub scanning directions. The engagement part is provided in a position toward a first main scanning direction relative to the sliding part, the first main scanning direction being one of the main scanning directions. The plurality of pairs of pinching parts include a first pair and a second pair that are arranged along the sub scanning directions. The second pair is provided in a position toward a second sub scanning direction relative to the first pair, the second sub scanning direction being the other of the sub scanning directions. Of the two pinching parts in the second pair, the pinching part provided in a position toward the first main scanning direction is biased by the first biasing member toward the rail part side, and the pinching part provided in a position toward a second main scanning direction is not biased by the first biasing member, the second main scanning direction being the other of the main scanning directions.

An image forming apparatus of the present disclosure includes the image reading device of the present disclosure.

An optical unit of the present disclosure is an optical unit configured to read an image from an original document by scanning the original document in at least one of sub scanning directions. The optical unit of the present disclosure includes: a sliding part configured to slide while being in contact with a rail part that is provided so as to extend in the sub scanning directions; a plurality of pairs of pinching parts; a biasing member; and an engagement part configured to be engageable with a driving device. Each of the plurality of pairs of pinching parts is configured to pinch the rail part from both sides thereof in terms of main scanning directions that are orthogonal to the sub scanning directions. The biasing member is provided for at least one of the pinching parts and is configured to bias the pinching part toward the rail part side. The center of gravity of the optical unit of the present disclosure is in a position toward a first sub scanning direction, relative to the middle point of the optical unit of the present disclosure in terms of the sub scanning directions, the first sub scanning direction being one of the sub scanning directions. The engagement part is provided in a position toward a first main scanning direction relative to the sliding part, the first main scanning direction being one of the main scanning directions. The plurality of pairs of pinching parts include a first pair and a second pair that are arranged along the sub scanning directions. The second pair is provided in a position toward a second sub scanning direction relative to the first pair, the second sub scanning direction being the other of the sub scanning directions. Of the two pinching parts in the second pair, the pinching part provided in a position toward the first main scanning direction is biased by the biasing member toward the rail part side, and the pinching part provided in a position toward a second main scanning direction is not biased by the biasing member, the second main scanning direction being the other of the main scanning directions.

DETAILED DESCRIPTION

Figure 1:
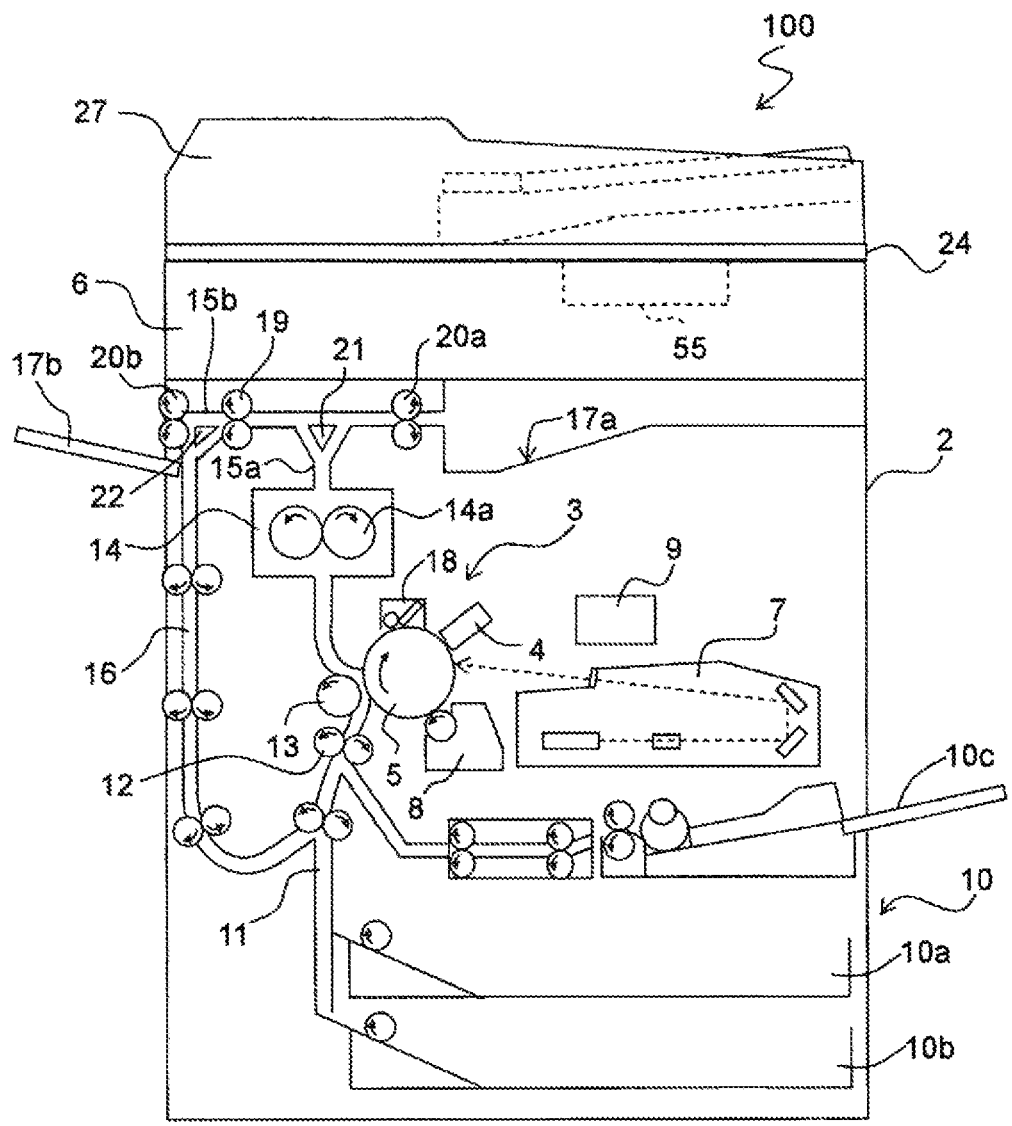
FIG. 1 is a cross-sectional view of an image forming apparatus according to one embodiment of the present disclosure.

The following describes an embodiment of the present disclosure with reference to the accompanying drawings. In the present embodiment, the directions of arrows A and B in the drawings correspond to sub scanning directions. The directions of arrows C and D in the drawings correspond to main scanning directions. Further, the arrow A side corresponds to a first sub scanning direction. The arrow B side corresponds to a second sub scanning direction. Further, the arrow C side corresponds to a first main scanning direction. The arrow D side corresponds to a second main scanning direction. The directions of arrows A and B are orthogonal to the directions of arrows C and D.

First, a configuration of an image forming apparatus 100 according to the present embodiment will be explained, primarily with reference to FIG. 1.

As shown in FIG. 1, the image forming apparatus 100 includes a multifunction peripheral main body 2, an image reading device 6 provided over the multifunction peripheral main body 2, a platen (an original document presser) 24, an original document conveyance device 27, a stack bypass (a manual feed tray) 10c, a first exit tray 17a (a discharging section); and a second exit tray 17b (a discharging section). The following are provided on the inside of the multifunction peripheral main body 2: an image forming section 3; a transfer roller 13 (an image transfer section); a fusing section 14; a paper feed mechanism 10; a conveyance path 11; a pair of registration rollers 12; sets of branching paths 15a and 15b; path switching mechanisms 21 and 22; a pair of exit rollers 20a; and a pair of exit rollers 20b. The paper feed mechanism 10 is detachably attached to the multifunction peripheral main body 2.

The image forming section 3 includes an electric charging unit 4, a photosensitive drum 5, an exposure unit 7, a developing unit 8, a toner container 9, and a cleaning device 18. Although not shown in the drawings, an electric charge eliminating device configured to eliminate a residual charge on the surface of the photosensitive drum 5 is provided on the downstream side of the cleaning device 18. The fusing section 14 includes a pair of fusing rollers 14a.

The paper feed mechanism 10 includes a paper feed cassette 10a (an upper cassette) and a paper feed cassette 10b (a lower cassette) used for storing recording media therein. The stack bypass 10c is positioned above the paper feed cassette 10a. The paper feed mechanism 10 is linked to the image forming section 3 via the conveyance path 11.

Figure 3:
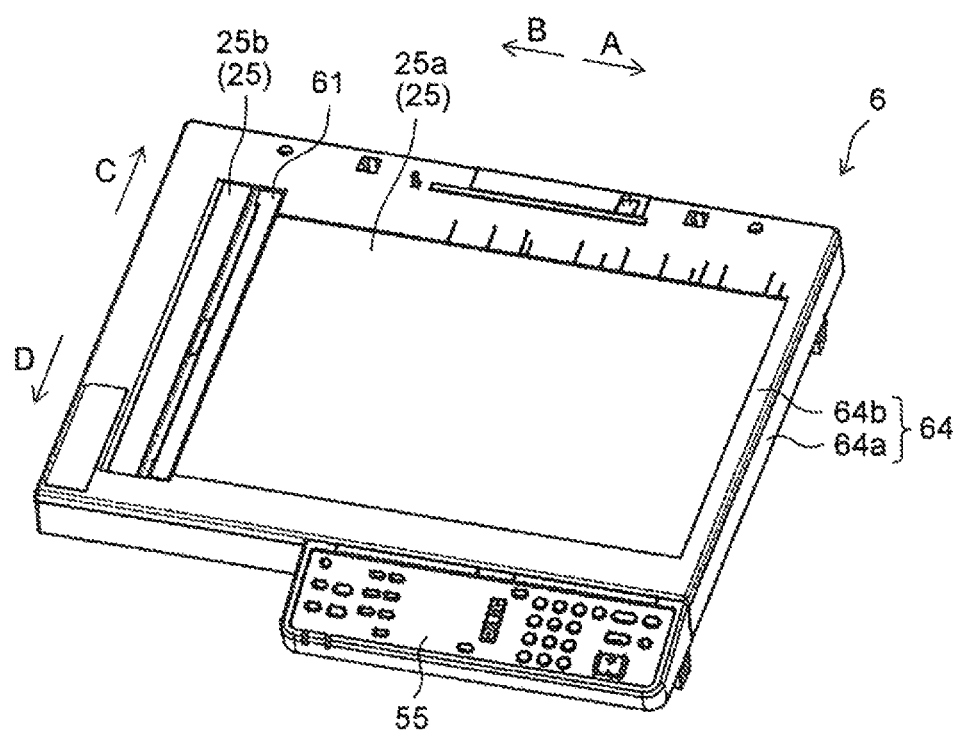
FIG. 3 is a perspective view of an image reading device according to the one embodiment of the present disclosure.

The image reading device 6 includes a document table (more specifically, a contact glass element 25 illustrated in FIG. 3) that is translucent. The platen 24 presses and holds an original document loaded on the document table (a glass plate) of the image reading device 6. The platen 24 is attached to the bottom face of the original document conveyance device 27 and is configured to move integrally with the original document conveyance device 27. The original document conveyance device 27 has a hinge part on one end thereof. It is possible to open and close the top face (the document table) of the multifunction peripheral main body 2 by causing the original document conveyance device 27 to pivot on the hinge part. The original document conveyance device 27 automatically conveys the original document that has been set, toward the image reading device 6.

Each of the sets of branching paths 15a and 15b is made up of a plurality of (e.g., two) branching conveyance paths. One of the conveyance paths in the set of branching paths 15a is linked to the first exit tray 17a via the pair of exit rollers 20a. The other of the conveyance paths in the set of branching paths 15a is linked to the set of branching paths 15b. One of the conveyance paths in the set of branching paths 15b is linked to the second exit tray 17b via the pair of exit rollers 20b. The other of the conveyance paths in the set of branching paths 15b is linked to a conveyance path 16. The path switching mechanism 21 is provided at the branching point of the set of branching paths 15a. The path switching mechanism 22 is provided at the branching point of the set of branching paths 15b. Each of the path switching mechanisms 21 and 22 includes a path switching guide and is configured to select one of the plurality of conveyance paths included in the corresponding one of the sets of branching paths 15a and 15b. In each of the sets of branching paths 15a and 15b, a recording medium is conveyed to the conveyance path selected by the corresponding one of the path switching mechanisms 21 and 22.

When the image forming apparatus 100 (e.g., a digital multifunction peripheral) copies an image, the image reading device 6 reads the image from an original document and generates image signals (image data). Subsequently, in the image forming section 3, the electric charging unit 4 causes the photosensitive drum 5 configured to rotate clockwise in FIG. 1 to be electrically charged uniformly. After that, on the basis of the image data read by the image reading device 6, a laser beam emitted from the exposure unit 7 (e.g., a laser scanning unit) forms an electrostatic latent image on the photosensitive drum 5. Subsequently, the developing unit 8 arranges toner serving as a developer to adhere to the electrostatic latent image formed on the photosensitive drum 5, so as to form a toner image. The toner container 9 supplies (replenishes) the toner to (for) the developing unit 8.

The recording medium (e.g., printing paper) is meanwhile conveyed from the paper feed mechanism 10 toward the photosensitive drum 5 on which the toner image is formed and the transfer roller 13, via the conveyance path 11 and the pair of registration rollers 12. After that, the transfer roller 13 transfers the toner image formed on the surface of the photosensitive drum 5 onto the recording medium. Subsequently, the recording medium on which the toner image has been transferred is separated from the photosensitive drum 5 and is conveyed toward the fusing section 14. After that, the fusing section 14 fuses the toner image onto the recording medium. Subsequently, the recording medium that passed through the fusing section 14 is sent toward the set of branching paths 15a.

When the recording medium is to be discharged onto the first exit tray 17a, the recording medium is discharged onto the first exit tray 17a from the conveyance path in the set of branching paths 15a via the pair of exit rollers 20a. In contrast, when the recording medium is to be discharged onto the second exit tray 17b, the recording medium is sent from the conveyance path in the set of branching paths 15a to the conveyance path in the set of branching paths 15b and is discharged onto the second exit tray 17b via the pair of exit rollers 20b. As another example, when images are to be copied onto both sides of a recording medium, the recording medium is sent from the conveyance path in the set of branching paths 15a to the conveyance path in the set of branching paths 15b, and is further sent from the conveyance path in the set of branching paths 15b to the conveyance path 16.

Next, a configuration of the original document conveyance device 27 will be explained, primarily with reference to FIG. 2.

Figure 2:
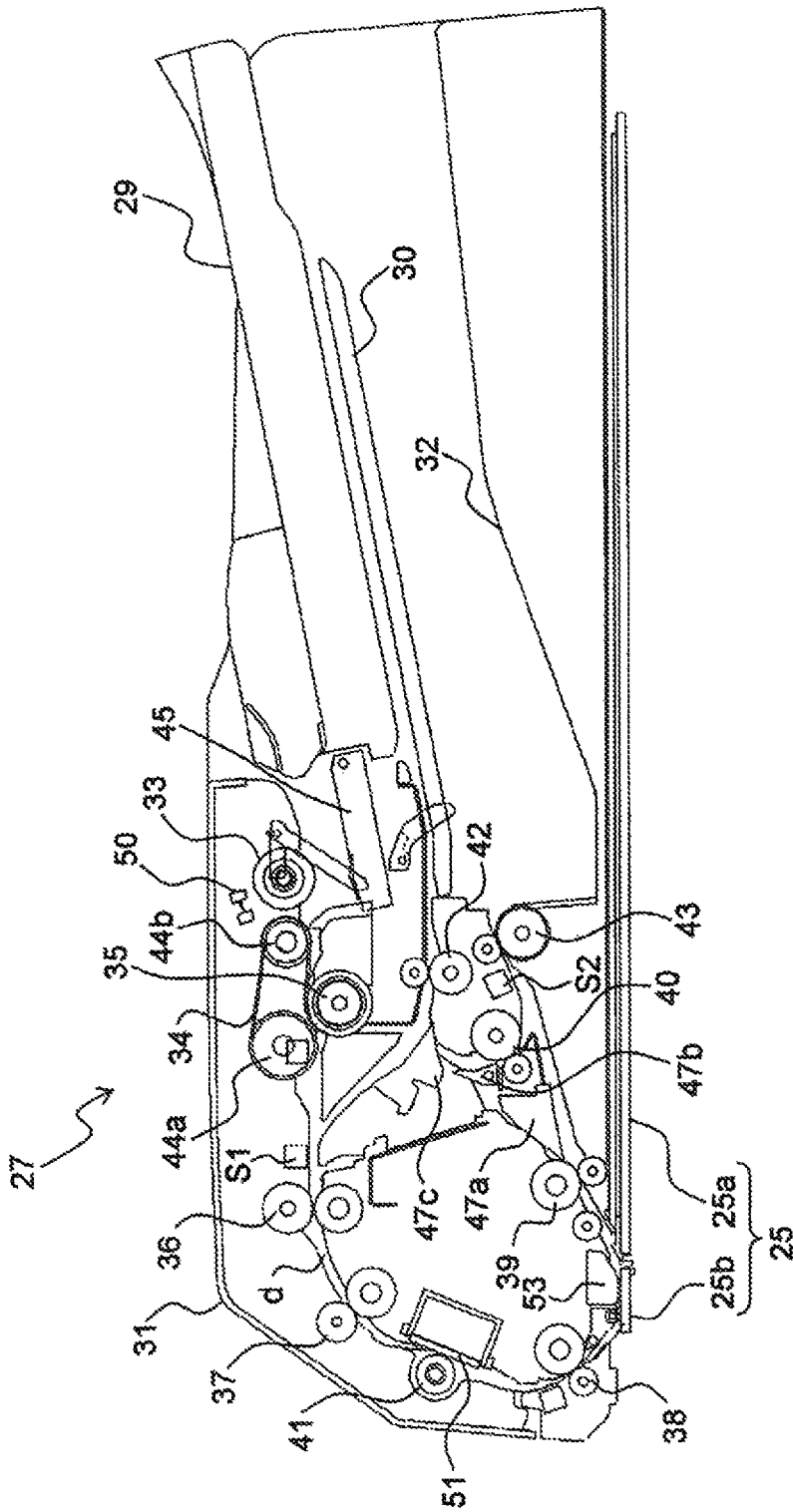
FIG. 2 is a cross-sectional view of an original document conveyance device employed in the image forming apparatus according to the one embodiment of the present disclosure.

As shown in FIG. 2, the original document conveyance device 27 includes a cover member 31. Further, the original document conveyance device 27 includes the following inside the cover member 31: a conveyance path d that extends from the paper feed tray 29 to an exit tray 32; original document conveyance members (a pickup roller 33, a paper feed belt 34, a separating roller 35, a pair of registration rollers 36, pairs of conveyance rollers 37, 38, 39, and 40, a Contact Image Sensor [CIS] roller 41, a pair of reversing rollers 42, a pair of exit rollers 43, a lift plate 45, and a conveyance guide 53) that are provided along the conveyance path d; and members (a Contact Image Sensor [CIS] 51, branching claws 47a, 47b, and 47c, and a reversing tray 30) that are used when images are read from both sides (a front side and a rear side) of an original document. The conveyance path d used for conveying a recording medium is curved so that the recording medium is reversed (flipped over) while travelling between the pair of registration rollers 36 and a glass plate for automatic reading (hereinafter, "automatic reading glass plate") 25b. Further, a plurality of paper detecting sensors (e.g., a paper feed sensor 51 and an exit sensor S2) configured to detect if an original document is present/absent or has passed through are provided in appropriate locations on the conveyance path d. The exit sensor S2 has a function of incrementing a sheet count of original documents, every time an original document conveyance process has been completed.

The paper feed belt 34 is spanned around a driving roller 44a and a driven roller 44b. With a predetermined level of pressure, the separating roller 35 is in contact with the paper feed belt 34 from the lower side thereof. The separating roller 35 has a torque limiter provided therein. If the rotation load of the separating roller 35 exhibits torque lower than a predetermined level, the separating roller 35 rotates in the direction opposite to the rotation direction of the paper feed belt 34. On the contrary, if the rotation load of the separating roller 35 exhibits torque higher than the predetermined level, the separating roller 35 rotates in the rotation direction of the paper feed belt 34. An upper surface detecting sensor 50 configured to detect the upper surface position of an original document is provided above the pickup roller 33.

Figure 4:
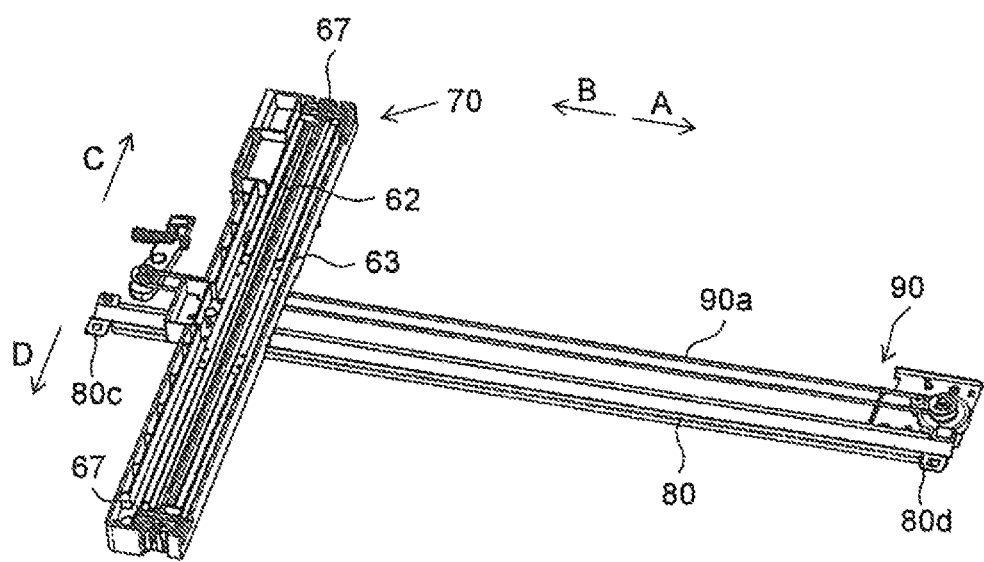
FIG. 4 is a perspective view of an optical unit, a rail part, and a driving device of the image reading device according to the one embodiment of the present disclosure.
Figure 5:
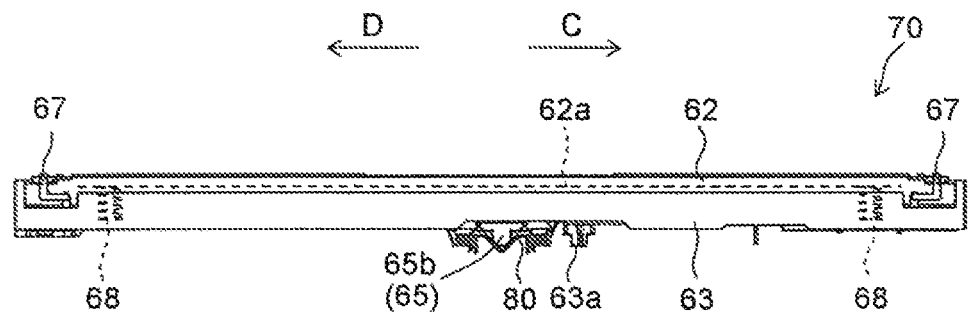
FIG. 5 is a cross-sectional view of the optical unit of the image reading device according to the one embodiment of the present disclosure.
Figure 6:
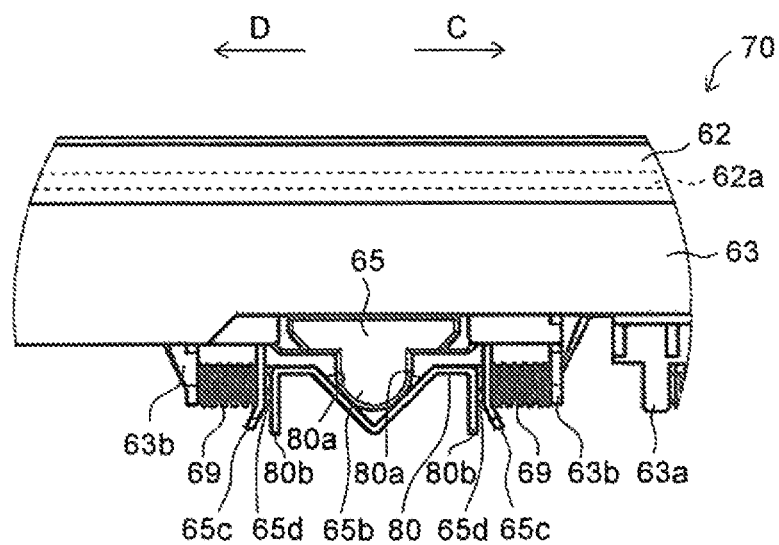
FIG. 6 is an enlarged view of a slider and the rail part of the image reading device according to the one embodiment of the present disclosure.

Next, a configuration of the image reading device 6 will be explained, primarily with reference to FIGS. 3 to 6. FIG. 3 is a perspective view of the image reading device 6. FIG. 4 is a perspective view of an optical unit 70, a rail part 80, and a driving device 90 of the image reading device 6. FIG. 5 is a cross-sectional view of the optical unit 70 of the image reading device 6. FIG. 6 is an enlarged view of a slider 65 and the rail part 80 of the image reading device 6.

The image reading device 6 includes the contact glass element 25, a resin member 61, a housing 64 (a frame), the optical unit 70, the rail part 80, and the driving device 90. The housing 64 is configured by using resin, for example.

As shown in FIG. 3, the contact glass element 25 includes a glass plate for a manually-placed original document (hereinafter, "manual placement glass plate") 25a and the automatic reading glass plate 25b. The housing 64 includes a lower frame 64a and an upper frame 64b. Edge parts of the manual placement glass plate 25a and the automatic reading glass plate 25b are placed on the lower frame 64a. Further, the edge parts of the manual placement glass plate 25a and the automatic reading glass plate 25b are adhered to the upper frame 64b via an adhesive agent layer (not shown). The resin member 61 is integrally formed with the upper frame 64b. The housing 64 has the optical unit 70 housed therein. The optical unit 70 is positioned underneath the contact glass element 25.

The resin member 61 is positioned between the manual placement glass plate 25a and the automatic reading glass plate 25b. The automatic reading glass plate 25b and the resin member 61 are each formed to have an oblong shape extending in the main scanning directions (the directions of arrows C and D). An original document can be loaded on the manual placement glass plate 25a. An original document that is automatically conveyed by the original document conveyance device 27 passes over the automatic reading glass plate 25b. The automatic reading glass plate 25b is provided with a white reference plate (not shown) used for correcting shading and an original document pressing section (not shown) used for pressing the white reference plate against the automatic reading glass plate 25b. The resin member 61 has a sloped face used for guiding the original document passing over the automatic reading glass plate 25b. The sloped face of the resin member 61 is configured to guide the original document by scooping up the original document. An end of the resin member 61 positioned on the manual placement glass plate 25a side functions as a reference plane against which an original document is caused to abut, when the original document is manually placed. Further, various original document positions and sizes are shown on the resin member 61.

The optical unit 70 is configured to read an image from an original document loaded on the contact glass element 25, by scanning the original document in a sub scanning direction (the direction of arrow A or B). As shown in FIG. 5, the optical unit 70 includes a scanner unit 62, a carriage 63, the slider 65, a plurality of sliding members 67, and a plurality of compression coil springs 68 (second biasing members). The scanner unit 62 is a device configured to read an image from an original document while being disposed underneath the contact glass element 25 and positioned on the compression coil springs 68. The carriage 63 reciprocates in the sub scanning directions while holding the scanner unit 62. The center of gravity of the optical unit 70 is positioned on the arrow A side, relative to the middle point (the center) of the optical unit 70 in terms of the sub scanning directions.

The scanner unit 62 includes a light source (not shown) and a Contact Image Sensor (CIS) 62a (a reading sensor). Light emitted from the light source is reflected by the original document and is received by the CIS 62a. Further, the home position of the scanner unit 62 is arranged to be directly beneath the white reference plate (not shown) of the automatic reading glass plate 25b. The sliding members 67 configured to slide while being in contact with the lower surface of the contact glass element 25 are provided on both ends, in terms of the main scanning directions (the directions of arrows C and D), of the top face of scanner unit 62. Because the scanner unit 62 implements the CIS method, it is possible to optimally read images without using any mirrors.

The sliding members 67 are pressed against the lower surface of the contact glass element 25. With this arrangement, the distance between the scanner unit 62 and the original document is maintained to be constant. As a result, even if the depth of field of the scanner unit 62 is shallow, it is easy to read an image from the original document in a uniform manner.

The compression coil springs 68 are positioned on both ends (the end on the arrow C side and the end on the arrow D side), in terms of the main scanning directions, of the carriage 63. The compression coil springs 68 bias the scanner unit 62 upward.

A projection part 63a (an engagement part) configured to be engageable with the driving device 90 is provided on the bottom face of the carriage 63. The projection part 63a is integrally formed with the carriage 63. The projection part 63a is positioned on the arrow C side, relative to the middle point (the center) of the carriage 63 in terms of the main scanning directions. Further, the projection part 63a is positioned on the arrow C side relative to sliding parts 65b.

As shown in FIG. 6, a plurality of supporting walls 63b projecting downward are provided on the bottom face of the carriage 63. Further, compression coil springs (first biasing members) 69 are provided on lateral faces (positioned on the slider 65 side) of the supporting walls 63b.

The slider 65 is fixed to the bottom face of the carriage 63. The slider 65 is positioned directly beneath the middle point (the center) of the optical unit 70 in terms of the main scanning directions. The slider 65 moves in the sub scanning direction (the direction of arrow A or B) while holding the carriage 63.

Figure 7:
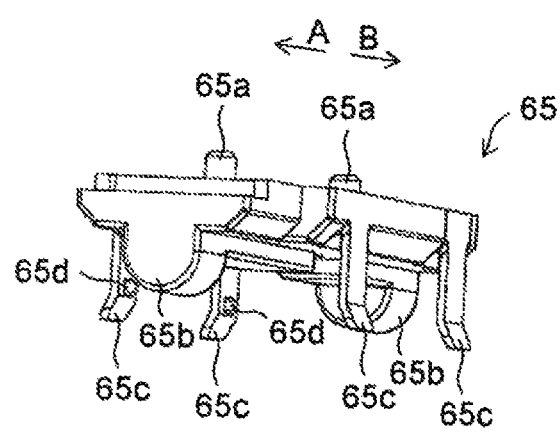
FIG. 7 is an enlarged perspective view of the slider of the image reading device according to the one embodiment of the present disclosure.

Next, a configuration of the slider 65 will be explained, primarily with reference to FIGS. 6 and 7. FIG. 7 is an enlarged perspective view of the slider 65.

The slider 65 includes a plurality of (e.g., two) fixing-purpose projections 65a, the plurality of (e.g., two) sliding parts 65b, a plurality of (e.g., four) pinching parts 65c, and a plurality of (e.g., four) projection parts 65d. The fixing-purpose projections 65a, the sliding parts 65b, and the pinching parts 65c are integrally formed by using resin. The fixing-purpose projections 65a are provided on the top face (the face on which the carriage 63 is placed) of the slider 65. The sliding parts 65b are arranged to slidably abut against the rail part 80. The pinching parts 65c are formed so as to extend downward.

One of the fixing-purpose projections 65a is positioned on the arrow A side, relative to the middle point (the center) of the slider 65 in terms of the sub scanning directions. The other of the fixing-purpose projections 65a is positioned on the arrow B side, relative to the middle point (the center) of the slider 65 in terms of the sub scanning directions. By press-fitting the fixing-purpose projections 65a into insertion holes (not shown) formed in the carriage 63, the slider 65 is fixed to the carriage 63.

Each of the sliding parts 65b has a tip end portion that has a substantially arc-shaped cross section when viewed in a sub scanning direction. Each of the sliding parts 65b is configured to slide while the tip end portion thereof is in contact with the rail part 80. Further, one of the sliding parts 65b is positioned on the arrow A side, relative to the middle point (the center) of the slider 65 in terms of the sub scanning directions. The other of the sliding parts 65b is positioned on the arrow B side, relative to the middle point (the center) of the slider 65 in terms of the sub scanning directions. Alternatively, it is also acceptable to provide only one sliding part 65b that extends in the sub scanning directions.

One of the pairs (hereinafter, "the first pair") of pinching parts 65c is positioned on the arrow A side, relative to the middle point (the center) of the slider 65 in terms of the sub scanning directions. The other of the pairs (hereinafter, "the second pair") of pinching parts 65c is positioned on the arrow B side, relative to the middle point (the center) of the slider 65 in terms of the sub scanning directions. The pinching parts 65c are configured so as to be elastically deformable in the main scanning directions (the directions of arrows C and D).

Each of the projection parts 65d is formed on the face on the inner side (the arrow C side or the arrow D side), in terms of the main scanning directions, of a corresponding one of the pinching parts 65c. The pinching parts 65c are provided on both ends (the end on the arrow C side and the end on the arrow D side) of the slider 65 in terms of the main scanning directions so as to pinch the rail part 80 from both sides thereof in terms of the main scanning directions. The projection parts 65d are configured to slide while abutting against the rail part 80.

The supporting walls 63b are provided on the outer side (the arrow C side and the arrow D side) of the pinching parts 65c of the slider 65. The compression coil springs 69 are provided in the spaces between the supporting walls 63b and the pinching parts 65c. The compression coil springs 69 are in contact with the outer faces, in terms of the main scanning directions, of the pinching parts 65c. The compression coil springs 69 bias the pinching parts 65c toward the inner side (the rail part 80 side) in terms of the main scanning directions.

The lower end of each of the pinching parts 65c is shaped so as to spread toward the outer side in terms of the main scanning directions. With this arrangement, it is possible to attach the slider 65 to the rail part 80 easily.

Figure 8:
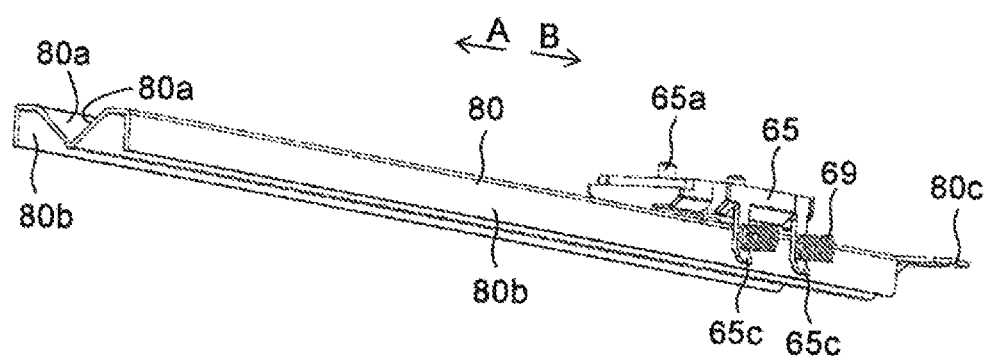
FIG. 8 is a perspective view of the slider and the rail part of the image reading device according to the one embodiment of the present disclosure.
Figure 9:
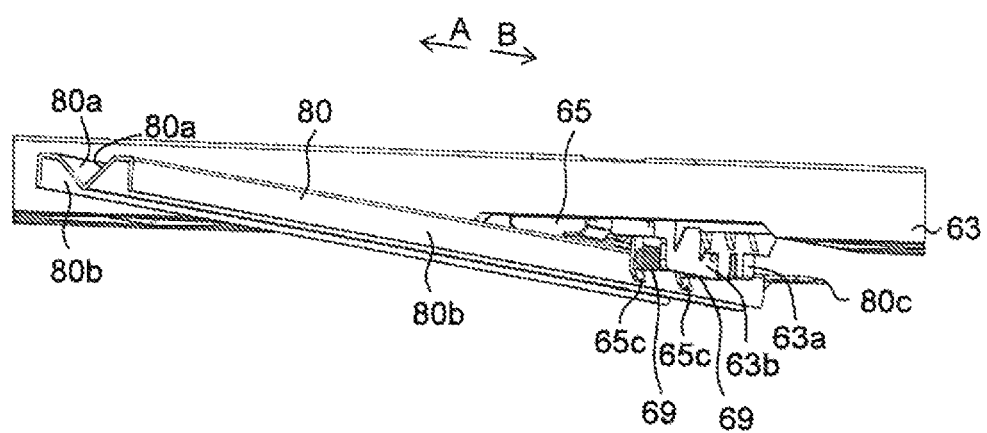
FIG. 9 is a perspective view of the slider, the rail part, and a carriage of the image reading device according to the one embodiment of the present disclosure.
Figure 10:
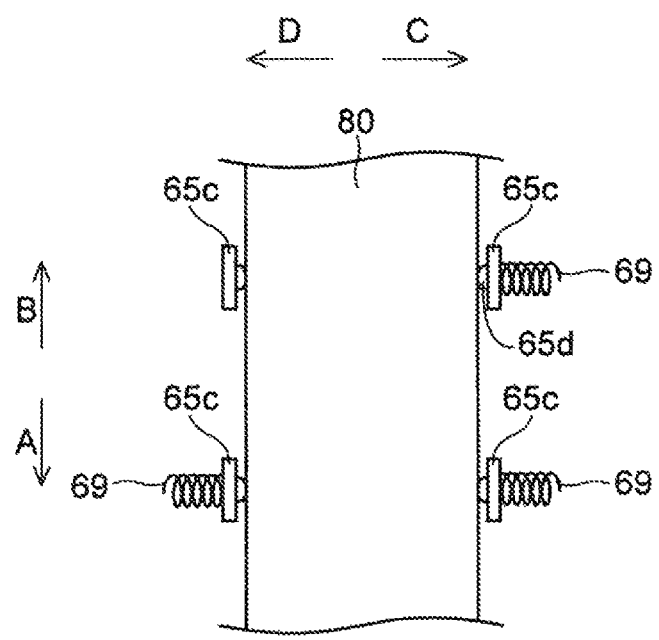
FIG. 10 is a drawing showing compression coil springs, pinching parts, and the rail part of the image reading device according to the one embodiment of the present disclosure.

Next, a configuration of the rail part 80 will be explained, primarily with reference to FIGS. 4, 6, 8, 9, and 10. FIG. 8 is a perspective view of the slider 65 and the rail part 80. FIG. 9 is a perspective view of the slider 65, the rail part 80, and the carriage 63. FIG. 10 is a drawing showing the compression coil springs 69, the pinching parts 65c, and the rail part 80.

The rail part 80 is provided so as to extend in the sub scanning directions (the directions of arrows A and B). The rail part 80 supports the optical unit 70 in such a manner that the optical unit 70 is slidable in the sub scanning directions.

The rail part 80 may be formed by bending sheet metal. The rail part 80 has a substantially M-shaped cross section when viewed in a sub scanning direction. The rail part 80 includes two sloped faces 80a, lateral walls 80b, a fixation part 80c, and an attachment part 80d. Each of the two sloped faces 80a is sloped with respect to a horizontal plane. The two sloped faces 80a sandwich the sliding parts 65b of the slider 65 in the main scanning directions. Each of the two sloped faces 80a abuts against the sliding parts 65b. The sliding parts 65b of the slider 65 are in contact with the two sloped faces 80a of the rail part 80 in two locations when viewed in a sub scanning direction.

The lateral walls 80b are positioned on both ends of the rail part 80 in terms of the main scanning directions (the directions of arrows C and D). The pinching parts 65c (or the projection parts 65d) of the slider 65 abut against the lateral walls 80b from both sides thereof in terms of the main scanning directions. The pinching parts 65c (or the projection parts 65d) are biased by the compression coil springs 69 and thus press the lateral walls 80b of the rail part 80 toward the inner side in terms of the main scanning directions (toward the sliding parts 65b side).

More specifically, as shown in FIG. 10, the image reading device 6 includes the plurality of pairs of pinching parts 65c. The plurality of pairs of pinching parts 65c include the first pair (the pair positioned on the arrow A side) and the second pair (the pair positioned on the arrow B side) that are arranged along the sub scanning directions. Each of the two pinching parts 65c in the first pair is biased by a corresponding one of the compression coil springs 69 toward the rail part 80 side. In contrast, of the two pinching parts 65c in the second pair, the pinching part 65c positioned on the arrow C side is biased by a corresponding one of the compression coil springs 69 toward the rail part 80 side; however, the pinching part 65c positioned on the arrow D side is not biased by any compression coil spring 69.

The fixation part 80c and the attachment part 80d are each fixed to, for example, the top face of the lower frame 64a (see FIG. 3). The fixation part 80c and the attachment part 80d may each be fixed to any arbitrary position. For example, the fixation part 80c and the attachment part 80d may each be fixed to the upper frame 64b.

The rail part 80 is, for example, fixed to the housing 64 (see FIG. 3) via the fixation part 80c by using one or more screws. The fixation part 80c is provided on one end of the rail part 80 on the arrow B side. The position of the fixation part 80c may arbitrarily be determined. For example, the fixation part 80c may be provided in a middle portion of the rail part 80 in terms of the sub scanning directions.

The rail part 80 is attached to the housing 64 (see FIG. 3) via the attachment part 80d. The attachment part 80d has formed therein an oblong hole extending in the sub scanning directions. A screw (not shown) is inserted into the oblong hole of the attachment part 80d. It is preferable to carry out the fixation (using the screw) of the rail part 80 to the housing 64 for the purpose of restricting any movements in the longitudinal directions (the sub scanning directions) in only one location (at the oblong hole formed in the attachment part 80d). When the fixation is cancelled (by loosening the screw), the rail part 80 becomes movable in the sub scanning directions.

Next, a configuration of the driving device 90 will be explained, primarily with reference to FIG. 4.

The driving device 90 includes an endless driving belt 90a and a motor (not shown) that rotates the driving belt 90a. The driving belt 90a engages with the projection part 63a of the carriage 63 so as to pull the optical unit 70. Further, the driving device 90 causes the optical unit 70 to reciprocate in the sub scanning directions.

More specifically, the driving belt 90a is positioned so as to extend along the sub scanning directions (the directions of arrows A and B). Further, the driving belt 90a rotates as a result of a driving force of the motor (e.g., a pulse motor; not shown) being transferred to the driving belt 90a. As a result of the rotation of the driving belt 90a, the optical unit 70 reciprocates along the rail part 80 (in the directions of arrows A and B).

Next, an example of an operation of the image forming apparatus 100 will be explained, primarily with reference to FIGS. 1 to 3.

To read an image from an original document by using the fixed original document method, the original document (not shown) is loaded on the manual placement glass plate 25a, with the image side (the side having the image to be read) facing down. Subsequently, a copy start button on an operating panel 55 of the image forming apparatus 100 is pressed. When the copy start button is pressed, the light source of the scanner unit 62 emits light onto the image side of the original document. Further, the scanner unit 62 moves from the scanner home side (the arrow B side) toward the scanner return side (the arrow A side) at a predetermined speed. As a result, the light reflected by the image side forms an image on the CIS 62a, which is a contact image sensor. The light that formed the image is decomposed into pixels by the CIS 62a so as to be converted into electric signals corresponding to levels of density of the pixels. Thus, the image signals (the image data) corresponding to the image on the original document are generated.

To read an image from an original document by using the sheet-through method, a plurality of sheets of an original document are set in the paper feed tray 29, with the image side (the side having the image to be read) facing up. Subsequently, the copy start button on the operating panel 55 of the image forming apparatus 100 is pressed. When the copy start button is pressed, the scanner unit 62 moves to a position directly beneath an image reading region (an image reading position) of the automatic reading glass plate 25b. After that, the light source of the scanner unit 62 emits light toward the automatic reading glass plate 25b. Further, the original document conveyance device 27 sequentially conveys the sheets of the original document while lightly pressing the sheets against the automatic reading glass plate 25b. Each of the sheets of the original document that are sequentially conveyed passes by the automatic reading glass plate 25b while abutting against the conveyance guide 53. As a result, the light is radiated onto the image side of each of the sheets of the original document that are sequentially conveyed, and the light reflected by the image side of each sheet forms an image on the CIS 62a, which is a contact image sensor. The light that formed the image is decomposed into pixels by the CIS 62a so as to be converted into electric signals corresponding to levels of density of the pixels. Thus, the image signals (the image data) corresponding to the images on the original document are generated.

Next, an example of an operation (original document automatic conveyance) performed by the original document conveyance device 27 will be explained, primarily with reference to FIGS. 1 to 3.

When the copy start button of the operating panel 55 is pressed, a raising and lowering mechanism (not shown) raises the lift plate 45. After that, the raised lift plate 45 presses the pickup roller 33 upward, while the original document is interposed therebetween. As a result, the weight of a frame member (not shown) including the pickup roller 33 is applied to the lift plate 45. Accordingly, the top side of the original document is pressed against the pickup roller 33 by a predetermined level of pressure (paper feed pressure).

From among the sheets of an original document that have been set in the paper feed tray 29, a predetermined number of sheets (e.g., a plurality of sheets of the original document positioned on top) are sent to the paper feed belt 34 and the separating roller 35 by the pickup roller 33. After that, only the uppermost sheet among the plurality of sheets of the original document is separated by the separating roller 35 and conveyed (a primary paper feed) toward the pair of registration rollers 36. More specifically, after the leading edge of the original document is detected by the paper feed sensor S1, the original document is conveyed a predetermined distance. After that, because the motor that drives the rollers is stopped, the pickup roller 33 and the paper feed belt 34 both stop being driven. Thus, the primary paper feed has been finished. The original document on which the primary paper feed has been performed stops at a nip part of the pair of registration rollers 36, while the leading edge thereof is warped.

When a predetermined period of time has passed after the primary paper feed is finished, a secondary paper feed is started. For example, the pair of registration rollers 36 are driven and rotated by an operation of a motor (not shown) used for the secondary paper feed. After that, the original document is conveyed by the pair of registration rollers 36, the pairs of conveyance rollers 37, 38, and 39, and the CIS roller 41, to reach the pair of exit rollers 43 via the automatic reading glass plate 25b. Further, the original document is discharged onto the exit tray 32 by the pair of exit rollers 43. When the exit sensor S2 detects that the tail edge of the original document has passed, the process of reading an image from one sheet of original document is completed. The exit sensor S2 increments the sheet count of original documents every time the original document conveyance process has been completed. Further, if the paper feed sensor S1 has detected that there is another sheet of original document that follows, the second and the following sheets of the original document are conveyed in the same manner as with the first sheet of the original document.

As a method for reading images from both sides of an original document, a one-stage reading method or a two-stage reading method, for example, may be used. When the one-stage reading method is used, an image is read from the rear side of the original document by using the Contact Image Sensor (CIS) 51 provided so as to oppose the CIS roller 41, and an image from the front side of the original document is read through the automatic reading glass plate 25b. When the two-stage reading method is used, after an image is read from the front side of the original document through the automatic reading glass plate 25b, the original document is directed toward the reversing tray 30 by branching claws 47a, 47b, and 47c. After that, by causing the pair of reversing rollers 42 to rotate in the opposite direction, the original document is again conveyed to the upstream side of the pair of registration rollers 36, with the rear side of the original document facing up, so that an image is read from the rear side of the original document through the automatic reading glass plate 25b.

Figure 11:
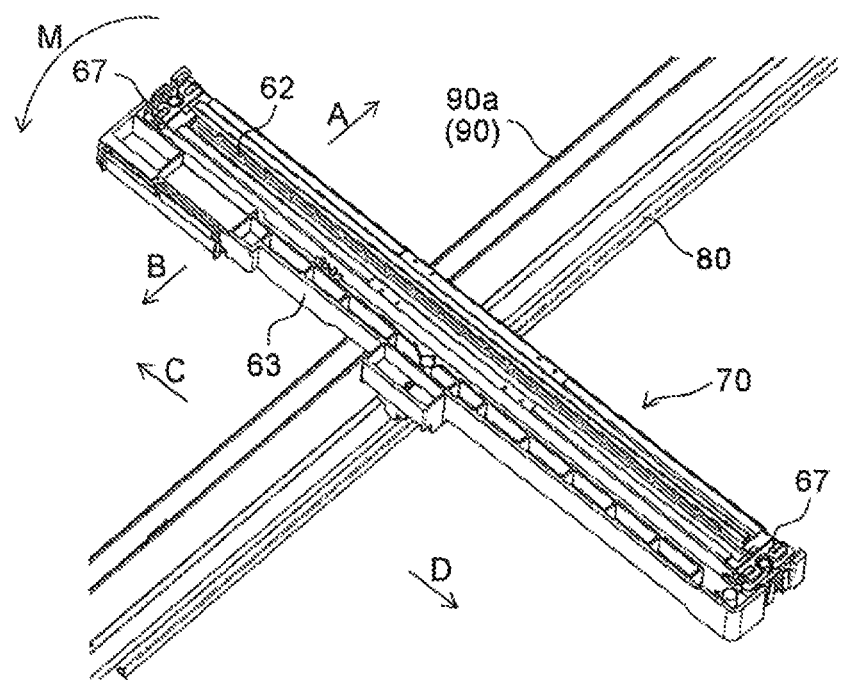
FIG. 11 is a perspective view of the optical unit, the rail part, and the driving device of the image reading device according to the one embodiment of the present disclosure.
Figure 12:
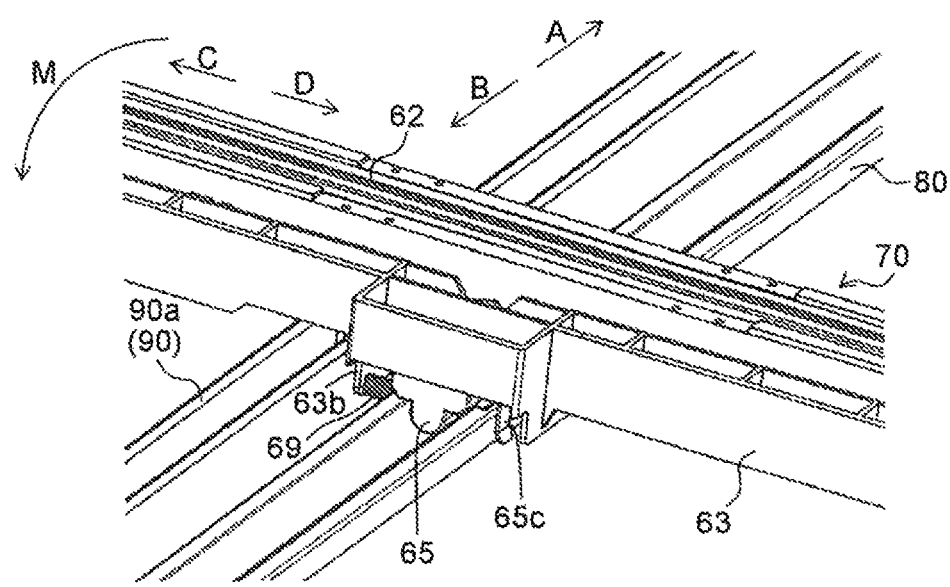
FIG. 12 is a perspective view of the optical unit, the rail part, and the driving device of the image reading device according to the one embodiment of the present disclosure.

The optical unit 70 is driven by the driving device 90 so as to reciprocate in the sub scanning directions. More specifically, the driving belt 90a pulls the optical unit 70. Next, the reciprocating operation of the optical unit 70 will be explained, primarily with reference to FIGS. 10 to 12.

In the image reading device 6 according to the present embodiment, the center of gravity of the optical unit 70 is in a position toward the first sub scanning direction (on the arrow A side), relative to the middle point (the center) of the optical unit 70 in terms of the sub scanning direction. Thus, when the optical unit 70 is pulled in the first sub scanning direction (toward the arrow A side), neither the end of the optical unit 70 positioned toward the first sub scanning direction (on the arrow A side) nor the end of the optical unit 70 positioned toward the second sub scanning direction (on the arrow B side) is prone to lift easily.

Further, in the image reading device 6 according to the present embodiment, the projection part 63a is provided in a position toward the first main scanning direction (on the arrow C side) relative to the rail part 80. Thus, when the optical unit 70 is pulled in the second sub scanning direction (toward the arrow B side), a rotation moment on a horizontal plane as shown with arrows M in FIGS. 11 and 12 may occur in the optical unit 70.

Further, in the image reading device 6 according to the present embodiment, as shown in FIG. 10, of the four pinching parts 65c, the pinching part 65c provided in the position toward the second sub scanning direction (on the arrow B side) and toward the first main scanning direction (on the arrow C side) is biased by the compression coil spring 69 toward the rail part 80 side. However, the pinching part 65c provided in the position toward the second sub scanning direction (on the arrow B side) and toward the second main scanning direction (on the arrow D side) is not biased by any compression coil spring 69. Accordingly, it is possible to cancel (reduce) the rotation moment occurring in the optical unit 70 with a drag force of the compression coil springs 69.

As explained above, the image reading device 6 according to the present embodiment includes the rail part 80 that is made of sheet metal and is configured to support the optical unit 70 in such a manner that the optical unit 70 is slidable in the sub scanning directions. The image reading device 6 configured in this manner is able to reduce the cost, compared to when a metal shaft is used as the rail part 80. Further, by configuring the rail part 80 with sheet metal, it is possible to better inhibit deformation of the rail part 80 than when configuring the rail part 80 with resin. Further, as a result of inhibiting deformation of the rail part 80, it is possible to prevent degradation of the precision level in the image reading process that is performed by the optical unit 70 with the scan in the sub scanning direction.

Further, in the image reading device 6 according to the present embodiment, each of the sliding parts 65b has the tip end portion that has the substantially arc-shaped cross section when viewed in a sub scanning direction. The rail part 80 has the sloped faces 80a that are in contact with the tip end portions of the sliding parts 65b. In the image reading device 6 configured in this manner, it is possible to ensure that contact is made in the two locations along the sub scanning directions, even if there is a dimension error in any of the sliding parts 65b and the rail part 80. Thus, it is less likely that the sliding parts 65b and the rail part 80 have a gap therebetween, and it is therefore possible to inhibit vibrations during the scan performed in the sub scanning direction by the optical unit 70. Further, as a result of inhibiting vibrations, it is possible to prevent degradation of the precision level in the image reading process. Furthermore, during the scan performed in the sub scanning direction by the optical unit 70, it is possible to prevent a positional displacement from occurring in a center position (a reference position), in terms of the main scanning directions, between the image leading edge and the image tail edge.

Further, in the image reading device 6 according to the present embodiment, the optical unit 70 includes the plurality of pairs of pinching parts 65c, each of the pairs of pinching parts 65c being configured to pinch the rail part 80 from both sides thereof in terms of the main scanning directions. With this arrangement, even when a force in a main scanning direction (in a transversal direction) or a force on a horizontal plane in such a direction that rotates the optical unit 70 is applied to the optical unit 70, it is possible to prevent the tip end portions (the portions each having the substantially arc shape) of the sliding parts 65b from moving toward the upper side of the sloped faces 80a. As a result, it is possible to prevent the sliding parts 65b from having a positional displacement with respect to the rail part 80 and from rotating.

Further, in the image reading device 6 according to the present embodiment, the center of gravity of the optical unit 70 is in the position toward the first sub scanning direction (on the arrow A side), relative to the middle point of the optical unit 70 in terms of the sub scanning directions. Further, the projection part 63a configured to be engageable with the driving device 90 is provided in the position toward the first main scanning direction (on the arrow C side) relative to the sliding parts 65b. Of the two pinching parts 65c in the second pair that is provided in the position toward the second sub scanning direction (on the arrow B side) relative to the first pair, the pinching part 65c provided in the position toward the first main scanning direction (on the arrow C side) is biased by the compression coil spring 69 toward the rail part 80 side. However, the pinching part 65c provided in the position toward the second main scanning direction (on the arrow D side) is not biased by any compression coil spring 69.

As explained above, in the image reading device 6 according to the present embodiment, the center of gravity of the optical unit 70 is in the position toward the first sub scanning direction (on the arrow A side), relative to the middle point of the optical unit 70 in terms of the sub scanning directions. Thus, when the driving device 90 moves the optical unit 70 in the first sub scanning direction (toward the arrow A side), neither the end of the optical unit 70 positioned toward the first sub scanning direction (the same side as the center of gravity) nor the end of the optical unit 70 positioned toward the second sub scanning direction (the opposite side from the center of gravity) is prone to lift easily.

As explained above, in the image reading device 6 according to the present embodiment, of the two pinching parts 65c in the second pair, the pinching part 65c provided in the position toward the first main scanning direction (on the same side as the projection part 63a) is biased by the compression coil spring 69 toward the rail part 80 side. With this arrangement, when the driving device 90 moves the optical unit 70 in the second sub scanning direction (toward the arrow B side) by pulling the projection part 63a, it is possible to cancel (or reduce) the rotation moment on the horizontal plane with a reaction force of the compression coil spring 69. It is therefore possible to prevent the end of the optical unit 70 positioned toward the second sub scanning direction (on the opposite side from the center of gravity) from lifting and getting on top of the rail part 80.

As explained above, in the image reading device 6 according to the present embodiment, of the two pinching parts 65c in the second pair, the pinching part 65c provided in the position toward the second main scanning direction (on the opposite side from the projection part 63a) is not biased by any compression coil spring 69. Thus, even if the end of the optical unit 70 positioned toward the second sub scanning direction (on the opposite side from the center of gravity) happens to lift due to vibrations or the like during a scan performed by the optical unit 70, the optical unit 70 is likely to return to the proper position with the own weight thereof.

In the image reading device 6 according to the present embodiment, each of the two pinching parts 65c in the first pair is biased by the corresponding one of the compression coil springs 69 toward the rail part 80 side. Thus, it is possible to prevent the end positioned toward the first sub scanning direction (on the same side as the center of gravity of the optical unit 70) from having a positional displacement with respect to the rail part 80.

The image reading device 6 according to the present embodiment includes the frame (the housing 64) configured to house the optical unit 70 and the rail part 80 therein. Further, the fixation of the rail part 80 to the housing 64 for the purpose of restricting any movements in the longitudinal directions (the sub scanning directions) is carried out only in the one location. The image reading device 6 configured in this manner is able to better inhibit deformation of the rail part 80 that may be caused by the difference in the coefficients of thermal expansion between the housing 64 and the rail part 80 when the ambient temperature has risen, compared to an image reading device in which the fixation of the rail part 80 to the housing 64 in the longitudinal directions is carried out in two or more locations. Further, as a result of inhibiting deformation of the rail part 80, it is possible to prevent degradation of the precision level in the image reading process that is performed by the optical unit 70 with the scan in the sub scanning direction.

The present disclosure is not limited to the embodiment described above. It is possible to arbitrarily alter or omit any of the configurations in the embodiment described above, as long as the alterations and/or the omissions do not depart from the gist of the present disclosure.

For example, the image reading device does not necessarily have to be an image reading device installed in an image forming apparatus. The image reading device may be an image scanner or the like that is used separately from an image forming apparatus.

Figure 13:
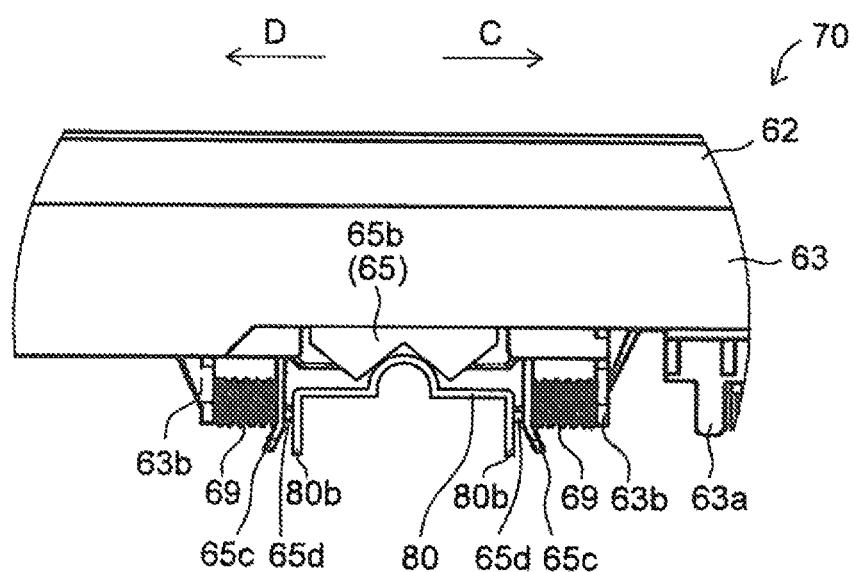
FIG. 13 is an enlarged view of a slider and a rail part of an image reading device according to a variation of the present disclosure.
Figure 14:
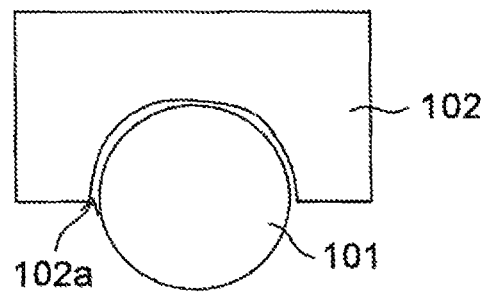
FIG. 14 is an enlarged cross-sectional view showing the examples of structures of a shaft (a rail part) and a bearing (a sliding part) of the image reading devices capable of reading images by implementing the two methods.
Figure 15:
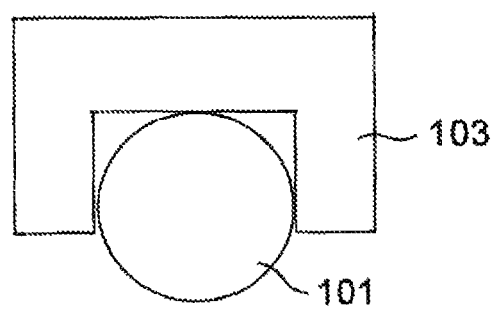
FIG. 15 is an enlarged cross-sectional view showing the other examples of structures of the shaft (the rail part) and the sliding part of the image reading devices capable of reading images by implementing the two methods.

For example, as shown in FIG. 13, another arrangement is also acceptable in which the rail part 80 has a tip end portion that has a substantially arc-shaped cross section when viewed in a sub scanning direction and in which each of the sliding parts 65b of the slider 65 has two sloped faces that are in contact with the tip end portion of the rail part 80. It should be noted, however, that when the rail part 80 is made of sheet metal, it is easier to form the sloped faces 80a in the rail part 80 than forming the tip end portion in the rail part 80.

In the embodiment described above, the sliding parts are integrally formed with the slider by using resin. However, the present disclosure is not limited to this example. For instance, the sliding parts may each be formed by using a metal shaft. When the sliding parts are each formed by using a metal shaft, because it is possible to reduce the usage amount of metal shafts compared to when the rail part is formed by using a metal shaft, it is more advantageous in terms of the cost.

In the embodiment described above, each of the two pinching parts 65c in the first pair provided in the position toward the first sub scanning direction (on the arrow A side) relative to the second pair is biased by the corresponding one of the compression coil springs 69 toward the rail part 80 side. However, the present disclosure is not limited to this example. For instance, another arrangement is also acceptable in which at least one of the two pinching parts 65c in the first pair is not biased by any compression coil spring 69.

What is claimed is:

1. An image reading device comprising:
   a document table on which an original document is loaded;
   an optical unit that is positioned underneath the document table and is configured to read an image from the original document loaded on the document table by scanning the original document in at least one of sub scanning directions;
   a rail part that is provided so as to extend in the sub scanning directions and is configured to support the optical unit in such a manner that the optical unit is slidable in the sub scanning directions; and
   a driving device configured to move the optical unit in the sub scanning directions, wherein
   the optical unit includes:
   a sliding part configured to slide while being in contact with the rail part;
   a plurality of pairs of pinching parts, each of the pairs of pinching parts being configured to pinch the rail part from both sides thereof in terms of main scanning directions that are orthogonal to the sub scanning directions;
   a first biasing member that is provided for at least one of the pinching parts and is configured to bias the pinching part toward the rail part side; and
   an engagement part configured to be engageable with the driving device,
   a center of gravity of the optical unit is in a position toward a first sub scanning direction, relative to a middle point of the optical unit in terms of the sub scanning directions, the first sub scanning direction being one of the sub scanning directions,
   the engagement part is provided in a position toward a first main scanning direction relative to the sliding part, the first main scanning direction being one of the main scanning directions,
   the plurality of pairs of pinching parts include a first pair and a second pair that are arranged along the sub scanning directions,
   the second pair is provided in a position toward a second sub scanning direction relative to the first pair, the second sub scanning direction being the other of the sub scanning directions, and
   of the two pinching parts in the second pair,
   the pinching part provided in a position toward the first main scanning direction is biased by the first biasing member toward the rail part side, and
   the pinching part provided in a position toward a second main scanning direction is not biased by the first biasing member, the second main scanning direction being the other of the main scanning directions.

2. An image reading device according to claim 1, wherein each of the two pinching parts in the first pair is biased by the first biasing member toward the rail part side.

3. An image reading device according to claim 1, wherein the sliding part has a tip end portion that has a substantially arc-shaped cross section when viewed in at least one of the sub scanning directions, and
the rail part has a sloped face that is in contact with the tip end portion of the sliding part.

4. An image reading device according to claim 1, wherein the rail part has a tip end portion that has a substantially arc-shaped cross section when viewed in at least one of the sub scanning directions, and
the sliding part has a sloped face that is in contact with the tip end portion of the rail part.

5. An image reading device according to claim 1, wherein the optical unit has a supporting wall that is positioned on an outer side of at least one of the pinching parts, and
the first biasing member is a compression coil spring disposed between said at least one of the pinching parts and the supporting wall.

6. An image reading device according to claim 1, comprising:
- a frame configured to house the optical unit and the rail part therein, wherein
- a fixation of the rail part to the frame for a purpose of restricting any movements in the sub scanning directions is carried out only in one location.

7. An image reading device according to claim 1, wherein the driving device includes: an endless belt configured to engage with the engagement part and to pull the optical unit in the sub scanning directions; and a motor configured to rotate the belt.

8. An image reading device according to claim 1, wherein the optical unit includes:
- a scanner unit configured to read the image from the original document;
- a carriage configured to hold the scanner unit; and
- a second biasing member that is provided for the carriage and is configured to bias the scanner unit toward the document table side.

9. An image forming apparatus comprising an image reading device according to claim 1.

10. An optical unit configured to read an image from an original document by scanning the original document in at least one of sub scanning directions, comprising:
- a sliding part configured to slide while being in contact with a rail part that is provided so as to extend in the sub scanning directions;
- a plurality of pairs of pinching parts, each of the pairs of pinching parts being configured to pinch the rail part from both sides thereof in terms of main scanning directions that are orthogonal to the sub scanning directions;
- a biasing member that is provided for at least one of the pinching parts and is configured to bias the pinching part toward the rail part side; and
- an engagement part configured to be engageable with a driving device, wherein
- a center of gravity of the optical unit is in a position toward a first sub scanning direction, relative to a middle point of the optical unit in terms of the sub scanning directions, the first sub scanning direction being one of the sub scanning directions,
- the engagement part is provided in a position toward a first main scanning direction relative to the sliding part, the first main scanning direction being one of the main scanning directions,
- the plurality of pairs of pinching parts include a first pair and a second pair that are arranged along the sub scanning directions,
- the second pair is provided in a position toward a second sub scanning direction relative to the first pair, the second sub scanning direction being the other of the sub scanning directions, and
- of the two pinching parts in the second pair,
  - the pinching part provided in a position toward the first main scanning direction is biased by the biasing member toward the rail part side, and
  - the pinching part provided in a position toward a second main scanning direction is not biased by the biasing member, the second main scanning direction being the other of the main scanning directions.

* * * * *